United States Patent [19]

Sprick

[11] Patent Number: 4,462,944

[45] Date of Patent: Jul. 31, 1984

[54] CARBURETOR WITH ROTARY MIXING VALVE

[76] Inventor: Ellis H. Sprick, 2855 Flintlock St., Eugene, Oreg. 97401

[21] Appl. No.: 453,614

[22] Filed: Dec. 27, 1982

[51] Int. Cl.³ .................... F02M 25/02; F02M 25/14
[52] U.S. Cl. ........................... 261/18 A; 261/18 B; 261/18 C; 261/69 R; 123/577; 137/607
[58] Field of Search ............. 261/18 C, 18 B, 18 A, 261/44 G; 123/577, 576; 137/607; 251/304

[56] References Cited

U.S. PATENT DOCUMENTS

| | | | |
|---|---|---|---|
| 418,011 | 12/1889 | Gurney et al. | 251/304 |
| 2,039,990 | 5/1936 | Gustafsson | 261/18 B |
| 2,155,560 | 4/1939 | Malouf | 261/18 B |
| 2,518,657 | 8/1950 | Boyce | 261/18 A |
| 2,569,377 | 9/1951 | Hans | 261/18 C |
| 2,584,911 | 2/1952 | Orr, Jr. | 261/18 A |
| 2,844,407 | 7/1958 | Deport | 137/607 |
| 2,893,425 | 7/1959 | Rimsha et al. | 137/607 |
| 3,805,756 | 4/1974 | Madariaga | 261/18 B |
| 4,354,477 | 10/1982 | Sprick | 123/577 |

FOREIGN PATENT DOCUMENTS 703113 1/1954 United Kingdom ............ 261/18 B

Primary Examiner—Tim R. Miles
Attorney, Agent, or Firm—James D. Givnan, Jr.

[57] ABSTRACT

A mixing valve receives primary and auxiliary fuel flows within a valve mixing chamber of arcuate shape. Primary and auxiliary valve components are coaxially and rotatably disposed in the valve housing with each including a flow control arm which regulates primary and auxiliary fluid flow through housing defined ports. A three-way valve is operable to interrupt an auxiliary fuel flow in those instances when unmixed primary fuel is required. A valve control assembly is actuated by a diaphragm valve responsive to manifold pressure and includes control rods and linkages for actuating the primary and auxiliary valve components. A solenoid carried by one of the control rods is operable during certain engine conditions to cause differential rod movement to reduce the flow of auxiliary fuel when detonation is unlikely. Provision is made for the optional use of water as an anti-detonate fluid.

10 Claims, 8 Drawing Figures

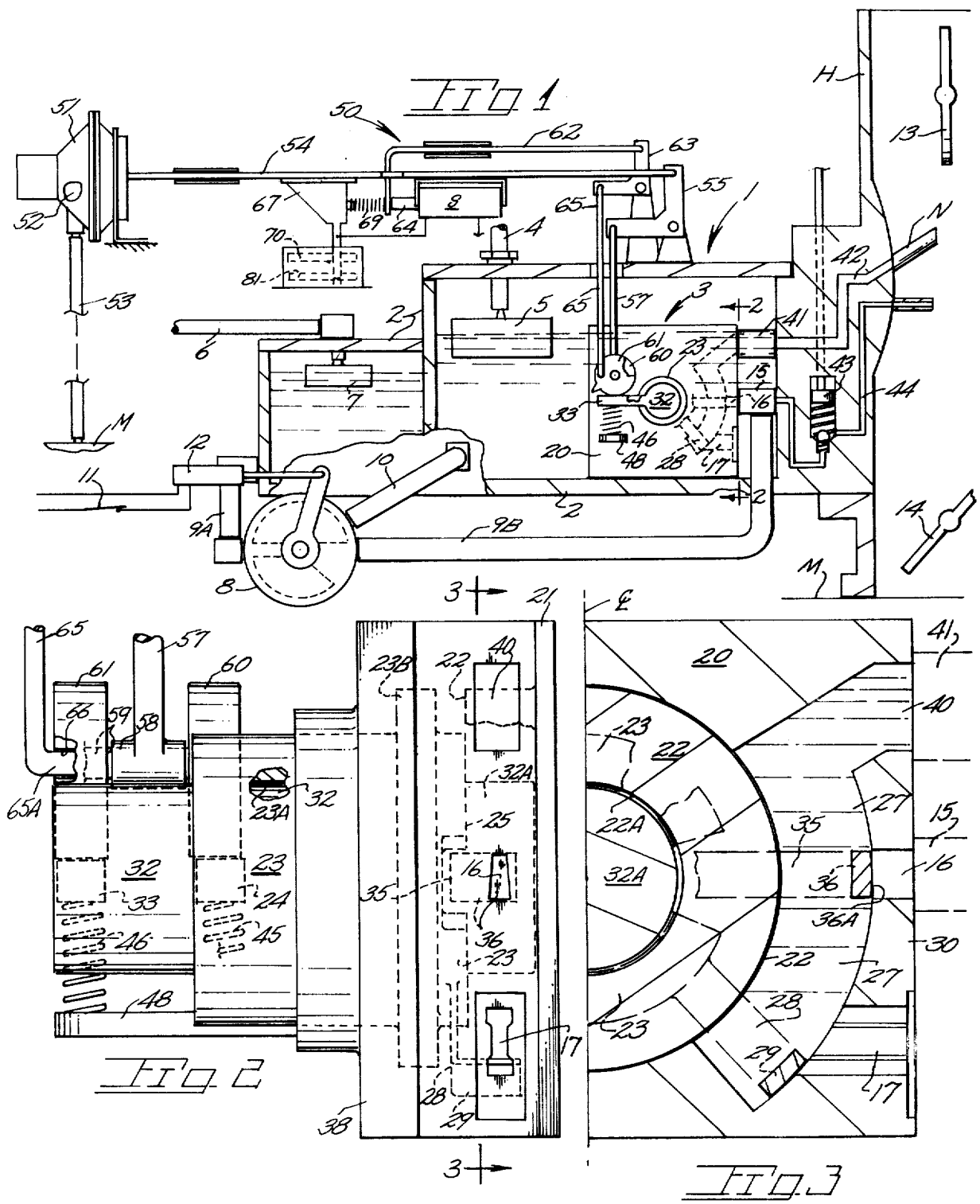

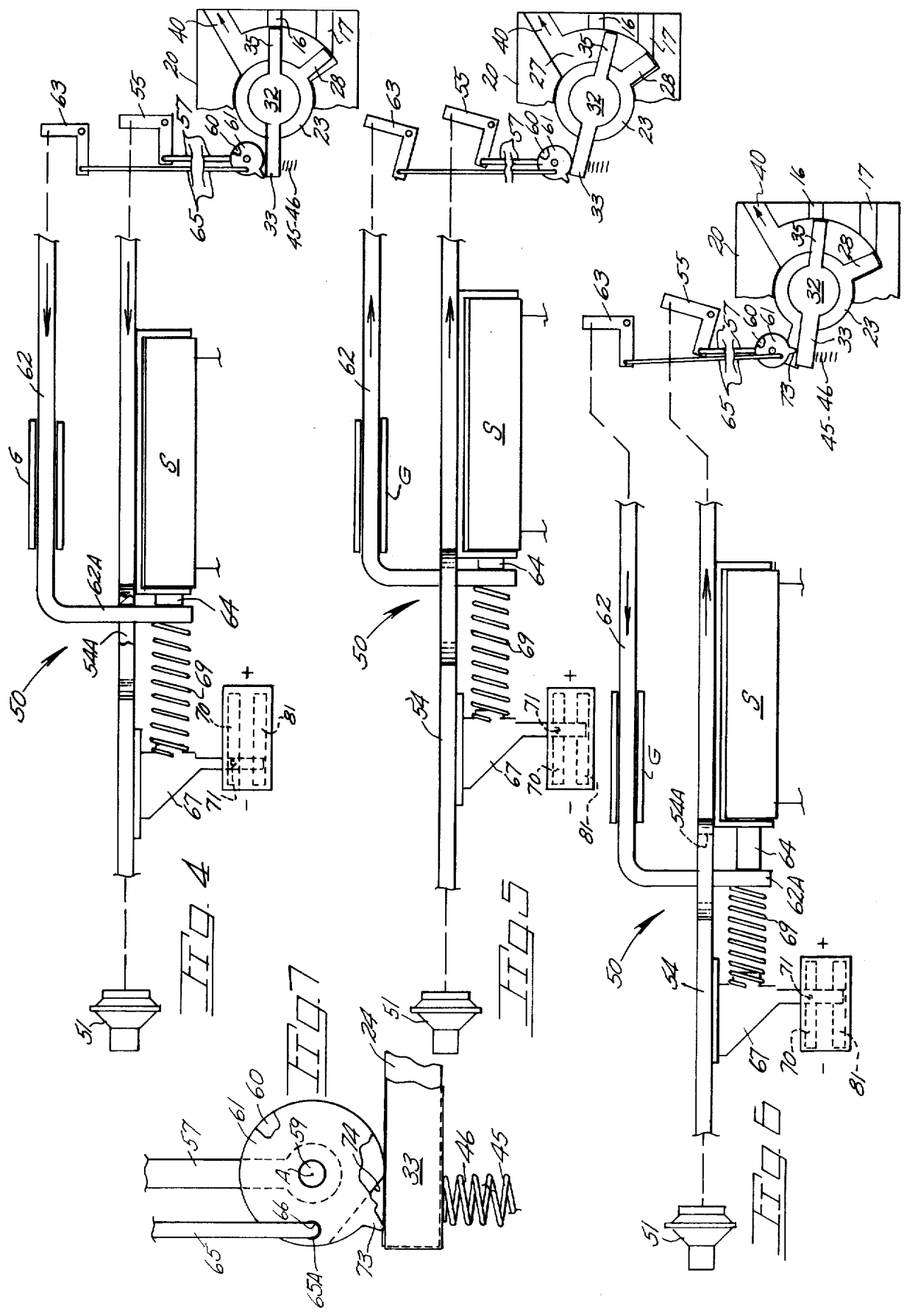

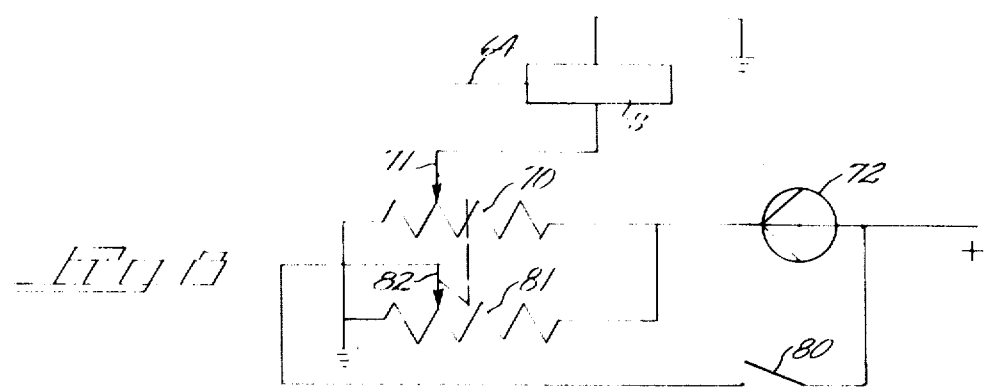

CARBURETOR WITH ROTARY MIXING VALVE

BACKGROUND OF THE INVENTION

The present invention pertains generally to a carburetor for the mixing of an auxiliary fluid such as fuel or water with a primary fuel flow to prevent engine detonation during periods of peak engine loads. In the prior art are carburetors capable of mixing a primary and secondary flow for the purpose of avoiding detonation and overheating of the engine. Current engine design results in compression ratios of about 8 to 1 to achieve satisfactory performance with fuels having reduced octane ratings resulting from the mandatory reduction of lead in gasoline. The reduction in the compression ratios of current engines results in the engines being less efficient than say an engine having a compression ratio of 9.5 to 1 or higher. U.S. Pat. No. 4,354,477, issued to the present inventor, discloses a carburetor directed toward providing a temporary mixed fuel flow for those periods of peak engine demand to prevent detonation enabling use of engines having optimum or efficient compression ratios. Additional prior art carburetors of some interest are found in U.S. Pat. Nos. 2,616,404; 2,319,773; 3,805,756; 2,321,211; 4,085,720 and 4,090,484. The foregoing patents all disclose carburetors capable of mixing two fluid flows prior to discharge into an engine intake system. U.S. Pat. No. 2,616,404 summarizes the advantages of varying an auxiliary fuel flow at all stages of engine operation.

U.S. Pat. Nos. 2,465,549 and 2,584,911 disclose rotary type mixing valves for mixing water and gasoline for use in aircraft engines. The rotary type mixing valves disclosed therein have circular mixing chambers with but one vane to severely limit mixing valve usefulness.

SUMMARY OF THE INVENTION

The present invention is embodied within a carburetor capable of mixing two fluid flows within a mixing chamber of a size conducive to rapid delivery of a fuel charge with an altered octane rating to the engine to avoid lags encountered in previous types of mixing valves in conjunction with a control system for the mixing valve effecting precise control of the auxiliary fuel or fluid.

The carburetor includes a mixing valve assembly having first and second arcuately positionable valve components each of which moves arcuately to regulate an incoming fluid flow through a port associated therewith. A first rotatable valve component controls a primary fuel flow such as gasoline while said second component may meter an anti-detonation alcohol or a water flow, termed an anti-detonate, into the valve mixing chamber.

A main fuel port serves as a main metering jet and is enlarged during periods of acceleration to admit added fuel for secondary enrichment. Detonation is avoided during acceleration by the actuation of the secondary valve component to admit auxiliary fuel flow such as alcohol, or with provision being made for terminating or substantially reducing the auxiliary flow during subsequent periods of high RPM engine operation where detonation is unlikely.

The present mixing valve assembly at all times admits a primary fuel flow into a mixing chamber which is of reduced size to effect rapid alteration of the fuel octane rating to avoid virtually all detonation without reliance on an on-board computer.

Important objects of the present invention include the provision of a carburetor mixing valve having arm-like valve members which meter fluid flows into a mixing chamber of restricted size to effect a rapid mixing and delivery to the intake manifold to prevent detonation and overheating of the engine; the provision of a carburetor at all times providing a chemically correct air-fuel ratio to an engine during engine idling, acceleration and high RPM cruise operations without reliance on an on-board computer to facilitate retro-fitting of older or pre-computer equipped autos to permit same to run satisfactorily with lower octane fuel; the provision of a carburetor which provides an automatic cutoff of an auxiliary fuel during engine starting and initial vehicle "drive away" operation; the provision of a carburetor mixing valve which terminates the use of an auxiliary fuel or detonation retardant fluid during periods of reduced power requirements such as during cruise, i.e., high intake manifold pressure and mid-to-upper range of RPM speeds, when detonation is not likely to occur; the provision of a carburetor and control system therefor which is readily adaptable to mixing alcohol or water with a primary fuel flow; the provision of a carburetor with the capability of mixing an octane increasing fluid with a primary fuel flow during those conditions of engine operation when detonation is likely to occur and conserving the octane increasing fluid in the absence of said conditions.

BRIEF DESCRIPTION OF THE DRAWINGS

In the drawings:

FIG. 1 is a schemtic view of a carburetor shown in section within which is the present mixing valve assembly;

FIG. 2 is an elevational view of the mixing valve assembly taken approximately along line 2—2 of FIG. 1;

FIG. 3 is a vertical sectional view taken along line 3—3 of FIG. 2 and broken away along a vertical centerline of the valve assembly;

FIG. 4 is a schematic view of a mixing valve control assembly shown positioned for constant speed engine operation;

FIG. 5 is a view similar to FIG. 4 showing the control assembly repositioned to effect a fuel flow for engine low speed acceleration;

FIG. 6 is a view similar to FIGS. 4 and 5 but showing the control system positioned to provide a fuel flow during operation of the engine at its upper RPM range.

FIG. 7 is an enlarged fragmentary side elevational view of the control discs and associated linkage segments which act on valve control arms; and FIG. 8 is a wiring schematic.

DETAILED DESCRIPTION OF THE PREFERRED EMBODIMENTS

With continuing attention to the drawings wherein applied reference numerals indicate parts similarly hereinafter identified, the reference numeral 1 indicates generally a carburetor having a compartmented fuel bowl at 2 within which is disposed a mixing valve indicated generally at 3. The fuel bowl is served by a main fuel line 4 with a float at 5 regulating the flow of a primary fuel such as gasoline into the fuel bowl.

An auxiliary fluid flow to the carburetor is via a source shown as a conduit 6 which delivers the auxiliary flow via an inlet controlled by a float 7. A three-way valve 8 normally directs an auxiliary fluid flow to mixing valve 3 via conduits 9A-9B. Both conduits 4 and 6 are served by upstream pump means such as conventional fuel pumps. Actuation of three-way valve 8 from its position shown is by a solenoid 12 which valve then serves to route only a flow of the primary fuel into conduit 9B from a fuel outlet conduit 10. A switch 11 closes after engine starting and warm up to terminate the flow of the primary fuel through conduits 10 and 9B after engine starting and an initial drive away period. Switch 11 may be heat or timer actuated.

An air horn is indicated at H within which is a choke valve 13 actuated by an automatic choke or other suitable control. A throttle plate at 14 is controlled by throttle linkage, not shown, and served in the usual manner to regulate a fuel-air mixture flow into an engine intake manifold M.

Mixing valve 3 is disclosed as being in submerged placement within the carburetor fuel bowl to simplify delivery of primary fuel to the valve through a valve primary port 17 in the valve housing at 20. Delivery of an auxiliary fuel flow, as earlier noted, is by conduit 9B terminating at a fitting 15 with said flow entering the valve via an auxiliary port 16.

With particular attention to FIGS. 2 and 3 of the drawings, mixing valve 3 is closed at one end by a plate 21 having an inwardly extending annulus 22. The valve housing rotatably mounts a first rotary valve component at 23 having a control arm at 24 projecting radially from an exposed end segment of the component. The inner end of said component, in housing 20, terminates in an end wall surface 25 which abuts annulus 22 and partially defines a mixing chamber 27 of arcuate shape. Said inner end of valve component 23 carries a primary fuel flow control arm 28 and serves to position same relative primary fuel port 17 in a valve housing sidewall 30. Said control arm has a perpendicular distal end 29 with a surface positionable relative to port 17. Port 17 at all times defines at least an area constituting a main metering area to function in the manner of a main metering jet.

A secondary rotary valve component at 32 is journaled within a bore 23A in first component 23 and includes an external control arm 33 in place on a protruding end segment of the component while the inner end of said component is disposed within valve housing 20 and thereat is provided with a secondary flow control arm at 35 which arm terminates in a perpendicular distal end 36 having a surface 36A located proximate port 16 in the valve housing. Accordingly, synchronized or differential rotational movement of valve components 23 and 32, as later explained, positions their respective flow control arms 28 and 35 with respect to ports 17 and 16 to regulate the flow of primary and auxiliary fuel therethrough into mixing chamber 27. Closure plate annulus 22 is centrally bored at 22A to provide a boss for the innermost end 32A of valve component 32.

The external control arms 24 and 33 of each rotary valve component are biased upwardly at all times by helical springs 45 and 46 supported by a shelf 48 on housing 20.

Housing 20 is preferably made in segmented fashion to receive a radial flange 23B on valve component 23 with the flange being confined within a corresponding annular groove extending about the housing interior and the inner surface of a second closure plate 38.

A fuel discharge port at 40 serves to direct a fuel flow to a conduit segment 41 (FIG. 1) to provide a flow to a passageway 42 which terminates in communication with a nozzle N in the venturi of air horn H.

An accelerator pump at 43 functions in the normal manner to eject a quantity of auxiliary fuel into the carburetor venturi via a passageway 44 during rapid throttle plate movement.

Valve Control Assembly

A valve control assembly is indicated generally at 50 and includes rods and linkages actuated primarily by a diaphragm valve body 51 having a vacuum chamber 52 in communication with the engine intake manifold M via a vacuum line 53. Valve body 51 may be of conventional construction incorporating resilient components normally displacing a primary control rod 54 to the right, as viewed in FIG. 1, opposite to the influence of a negative or below atmospheric pressure in chamber 52 (induced by the engine intake manifold) acting to retract or move primary rod 54 in the lefthand direction.

Rod 54 terminates at a bellcrank 55 with a bellcrank arm pivotally actuating a linkage 57 which terminates downwardly in a boss 58 (FIGS. 2 and 7) in which is journaled a shaft 59. Shaft 59 carries at its ends spaced apart actuating discs 60-61 which act on valve arms 24 and 33 each integral, as earlier described, with first and second rotary valve components 23 and 32. A secondary control rod at 62 of the control assembly terminates at one end at a second bellcrank 63 having a remaining arm which actuates a secondary linkage at 65. An arm 65A projects from the linkage lower end into rotatable engagement with an aperture 66 in actuating disc 61. From the foregoing it is apparent that axial movement of linkage 65 imparts simultaneous rotation to both discs 60 and 61 about their aligned axes at A for later described purposes.

With attention to FIG. 4, secondary rod 62 has a depending end segment 62A which passes through an eye 54A formed in primary rod 54. End segment 62A is interposed between the end of an armature 64 of a solenoid S and a helical spring 69 which is bracket mounted at 67 on primary rod 54. Solenoid S is fixedly mounted on rod 54 by a suitable holder and moves therewith.

Control rod guides are provided as at G

A fixedly mounted potentiometer 70 has a movable contact 71 which is in circuit with the coil of solenoid S (FIG. 8) to enable varying the potential to the coil and hence control the degree of extension of its armature 64 as later elaborated upon.

A continuing description of the control assembly follows jointly with a description of its operation.

With particular attention to FIGS. 4, 5 and 6, FIG. 4 discloses, in schematic form, carburetor control system 50 with its components positioned to effect a fuel flow into the engine during operation of the engine at a normal constant speed operation. A low intake manifold pressure is applied to diaphragm valve 51 to cause primary rod 54 and hence secondary rod 62 to be displaced to the left to cause bellcranks 55 and 63 to bias their attached linkages 57 and 65 downwardly to impart counterclockwise movement to the rotary valve components 23 and 32 to simultaneously counterclockwise position their respective flow control arms 28 and 35 to respectively reduce the effective size of fuel port 17 and to reduce the effective size of auxiliary fuel port 16 with the first mentioned port functioning in the manner of a main metering jet. Solenoid S is inoperative at this stage with its armature 64 retracted by reason of contact 71 being located at the ground side of the potentiometer winding.

FIG. 5 is a schematic view of the carburetor control assembly potioned during acceleration with throttle plate 14 open whereat internal spring components of diaphragm valve 51 displace primary rod 54 to a right-hand extreme position whereat bellcrank 55 exerts a lifting action on linkage 57 to elevate both control discs 60 and 61 carried thereby to permit springs at 45 and 46 to impart clockwise rotation (as viewed in FIG. 3) to rotary valve components 23 and 32. Accordingly, flow control arm 28 further opens main port 17 so that same may now function in the general manner of a secondary enrichment jet. Similarly, flow control arm 35 simultaneously moves clockwise under spring bias to open auxiliary port 16 to admit a flow of auxiliary fuel such as alcohol (or water, as later described) into the mixing chamber 27. With the engine at normal operating temperature the auxiliary fuel, such as alcohol, will range up to thirty percent of the mixed fuel volume.

FIG. 6 discloses the carburetor control assembly positioned to effect an increased gasoline flow to the engine at high speed cruise while simultaneously significantly curtailing the flow of alcohol (or water) since the engine at high RPM with a high intake manifold pressure is unlikely to encounter detonation. A transducer-potientiometer circuit is energized at this stage. primarly control rod 54 is displaced to the right by a high intake manifold pressure acting on diaphragm valve 51 while rod 62 by reason of solenoid S being energized to extend armature 64, is repositioned in an opposite direction to the left as permitted by the lost motion coupling of the rods at eye 54A and rod end 62A. Energizing of the solenoid results from a contact 71 carried by rod mounted bracket 67 being positioned to the positive side of the winding of potentiometer 70 to induce a greater potential on the solenoid coil for greater displacement of armature 64. With a view to the wiring schematic of FIG. 8, a current source for the potentiometer is a transducer 72 producing voltage directly proportional to engine speed. The extension of solenoid armature 64 imparts movement to secondary rod 62 in the lefthand direction to cause bellcrank 63 to reposition its linkage 65 downwardly to rotate both control discs 60-61 with disc 61 having a camming surface high dwell 73 thereon moving into contact with arm 33 of valve component 32 to move flow control arm 35 upwardly to close auxiliary port 16. Simultaneously, remaining main flow control arm 28 is moved downwardly or clockwise by spring action on control arm 24 to further open primary port 17 to provide an adequate fuel flow during high RPM engine operation. Control arm 24, at this time, moves upwardly against a camming surface low dwell portion 74 on control disc 60. Control disc rotation occurs simultaneously by reason of axial displacement of linkage 65.

In those instances where water is the anti-detonate liquid it is desirable to provide for added closing movement of auxiliary flow control arm 35. For this purpose a switch 80 in the schematic of FIG. 8 is closed by the vehicle operator to induce a voltage potential on a second potentiometer at 81 having a movable contact 82 which moves with movable contact 71 of the first described potentiometer 70. The supplemental voltage increase via potentiometer 81 enables potentiometer 70 and its moving contact 71 to energize solenoid S in a manner causing accentuated outward positioning of its armature 64. Accordingly, auxiliary flow control arm 35 of the mixing valve is positioned to close auxiliary port 16.

The present carburetor system is compatible with a two stage carburetor with the additional air intake barrel or barrels of the air horn being served by a second stage mixing valve very similar to the one earlier described. The primary and auxiliary flow control arms of the second stage mixing valve move in synchronized relationship with their counterparts in the first described mixing valve to mix the flows of gasoline and alcohol (or water). The second stage mixing valve would have its auxiliary flow control arm, when in its "closed" position, cracked to admit auxiliary fuel passage to the accelerating well or wells of the second stage barrels for refilling same. The control assembly above described would additionally actuate the second stage mixing valve by suitable couplings between the first and second valve component counterparts.

Switch 11 may incorporate a provision for manual actuation to direct a flow of primary fuel through three-way valve 8 in those instances when the auxiliary fuel supply has been depleted.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A valve for the mixing of liquids in an automotive fuel system, said valve comprising,
   a housing defining a primary port, an auxiliary port, a mixing chamber and a discharge port, and
   primary and auxiliary valve components adapted for coaxial rotational movement within said housing, each of said valve components including an arm disposed within said housing with the primary component distal arm end located adjacent said primary port to regulate a flow therethrough and the auxiliary distal arm end located adjacent said auxiliary port to regulate a flow therethrough into said mixing chamber, said primary and auxiliary components having segments located exteriorly of said housing and thereat adapted for actuation by a valve control assembly.

2. The valve claimed in claim 1 wherein said housing defines a mixing chamber of arcuate configuration.

3. The valve claimed in claim 2 wherein each of the component arms includes a distal end segment perpendicular to the remainder of the arm.

4. The valve claimed in claim 2 wherein one of said valve components is journaled within the remaining valve control.

5. The valve claimed in claim 2 wherein exteriorly located segments have radially projecting control arms.

6. In combination with a carburetor providing a fuel-air mixture to an engine, the improvement comprising,
   a housing defining a primary port, and auxiliary port, a mixing chamber and a discharge port,
   primary and auxiliary valve components adapted for coaxial rotational movement within said housing, each of said valve components including an arm disposed within said housing with the primary component distal arm end located adjacent said primary port to regulate a flow therethrough and the auxiliary distal arm end located adjacent said auxiliary port to regulate liquid flow therethrough into said mixing chamber, said primary and auxiliary components having segments located exteriorly of said housing and thereat adapted for actuating by a valve control assembly, and a valve control assembly including means responsive to engine intake manifold pressure, means actuated by said responsive means and imparting rotational movement to said primary and auxiliary valve components.

7. The improvement claimed in claim 6 wherein said actuated means includes primary and auxiliary control rods, said rods in lost motion engagement with one another to permit relative axial movement therebetween, a solenoid carried by one of said rods and having an armature imparting axial movement to the remaining control rod whereby the rotational relationship of the valve components may be varied.

8. The improvement claimed in claim 7 wherein said actuated means further includes rotatable primary and auxiliary actuating discs each having a camming surface thereon in individual contact with one each of said valve components, axial movement of said auxiliary control rod relative to said primary control rod imparting rotational movement to said actuating discs to locate the camming surfaces thereon so as to coact with said primary and auxiliary valve components.

9. The improvement claimed in claim 8 additionally including voltage regulating means in circuit with said solenoid whereby solenoid armature displacement and control rod displacement is proportional to the voltage output of said regulating means.

10. The improvement claimed in claim 9 wherein said voltage regulating means comprises a potentiometer having its movable contact positioned by the primary control rod of the control assembly.

* * * * *